Patented Feb. 11, 1947

2,415,796

UNITED STATES PATENT OFFICE 2,415,796

CHLOROACRYLOPHENONES AND POLYMERS

Joy G. Lichty, Stow, Ohio, assignor to Wingfoot Corporation, Akron, Ohio, a corporation of Delaware No Drawing. Application October 3, 1942, Serial No. 460,653

2 Claims. (Cl. 260—63)

This invention relates to chloroacrylophenones and, more particularly, to alpha monochloroacrylophenone and alpha, beta dichloroacrylophenone, their polymers or homopolymers and copolymers.

The new chloroacrylophenones may be represented by the following structural formula:

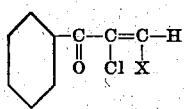

in which X is hydrogen or chlorine.

The preparation of alpha, beta dichloroacrylophenone is illustrated by the following equation:

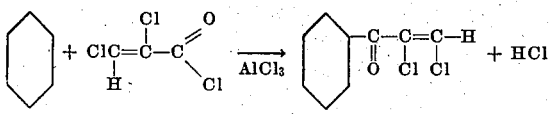

To 140 grams of anhydrous AlCl₃ was added 159.5 grams (1 mole) of alpha, beta dichloroacrylyl chloride. The resulting liquid melt was dissolved in 100 cc. of CS₂ and then 85 grams of benzene was added drop by drop under anhydrous conditions. HCl gas was given off, and this was swept out with CO₂ into aqueous NaOH containing 1 mole of NaOH. Methyl orange indicator showed when one mol of HCl was given off, and then ice was added to stop the reaction. Distillation of the benzene layer gave alpha, beta dichloroacrylophenone with a boiling point of 160–161° C./38 mm.

Using one mol of alpha monochloroacrylyl chloride instead of the dichloroacrylyl chloride in the above example, alpha monochloroacrylophenone is obtained. By using the proper acrylyl chloride, anyone of the following compounds may be obtained: alpha-methyl-beta-chloroacrylophenone, alpha - (chloromethyl) - acrylophenone, alpha- (chloromethyl) - beta-chloroacrylophenone, and the naphthyl homologues of all of the above-mentioned compounds.

The chloroacrylophenones of this invention can be polymerized, and they can be copolymerized with other monomers, such as butadiene, styrene, isoprene, dimethyl butadiene, 4-methyl 1,3-pentadiene, etc. The following example illustrates the polymerization and copolymerization of these chloroacrylophenones:

Water solution containing 6% Duponol and 2% Vultamol_____cc__ 10
McIlvaine's buffers to give the specified pH _____cc__ 10
CCl₄ _____g__ 0.48
5% NaCN_____cc__ 0.5
10% acetaldehyde _____cc__ 0.5
Butadiene _____g__ 9.6
Dichloroacrylophenone _____g__ 6.4

These products were polymerized for a period of forty-eight hours at 38° C.

Duponal is the sodium salt of lauryl sulfate. Vultamol is a wetting agent. The McIlvaine buffers are made by mixing 0.2 M disodium phosphate and 0.1 M citric acid solutions in varying proportions to vary the pH value. For example, using the above formula and varying the pH from 3.7 to 9, using 0.133 grams NaBO₃ as a catalyst, good yields of elastic and extrudable rubber-like copolymers were obtained. Doubling the sodium borate and using a pH of 3.7, a rubber-like copolymer was likewise obtained. Similarly, using alpha monochloroacrylophenone with butadiene, rubber-like copolymers are obtained. The ratio of the monomers may be varied from 90:10 to 10:90. Using no butadiene and 10 grams of either chloroacrylophenone, a rubber-like polymer of each phenone is obtained. Copolymers are likewise obtained if instead of butadiene, one copolymerizes with butadiene, dimethyl butadiene, 4-methyl 1,3-pentadiene or the like.

The above examples are merely illustrative of the invention. For example, it is not necessary to produce the copolymers in an emulsion. If an emulsion is employed, other emulsifying agents, catalysts, etc., may be used.

What I claim is:
1. Alpha, beta dichloroacrylophenone.
2. The polymer of alpha, beta-dichloroacrylophenone.

JOY G. LICHTY.

REFERENCES CITED

The following references are of record in the file of this patent:

UNITED STATES PATENTS

| Number | Name | Date |
|---|---|---|
| 2,091,373 | Nelles | Aug. 31, 1937 |
| 2,173,066 | Metzger | Sept. 12, 1939 |
| 2,137,664 | Bayer | Nov. 22, 1938 |
| 2,125,393 | Nelles (2) | Aug. 2, 1938 |
| 1,901,354 | Meisenberg | Mar. 14, 1933 |

FOREIGN PATENTS

| Number | Country | Date |
|---|---|---|
| 461,080 | British | Feb. 9, 1937 |
| 484,599 | British | Nov. 9, 1935 |

OTHER REFERENCES

Vorlander: Chem. Abstracts, vol. 17, p. 1379 (1923); Ber. vol. 56B, pp. 1136–44 (1923).

Beilsteins: Handbuch der Organ. Chem., Erstes Erganzungswerke 7th–8th vol., 4th ed., 1931, p. 190. (Copy in Div. 6.)